May 27, 1958  F. S. ANTOZAK  2,836,031
SELF CLEANING RAKE AND HANDLE STRUCTURE
Filed Nov. 3, 1954
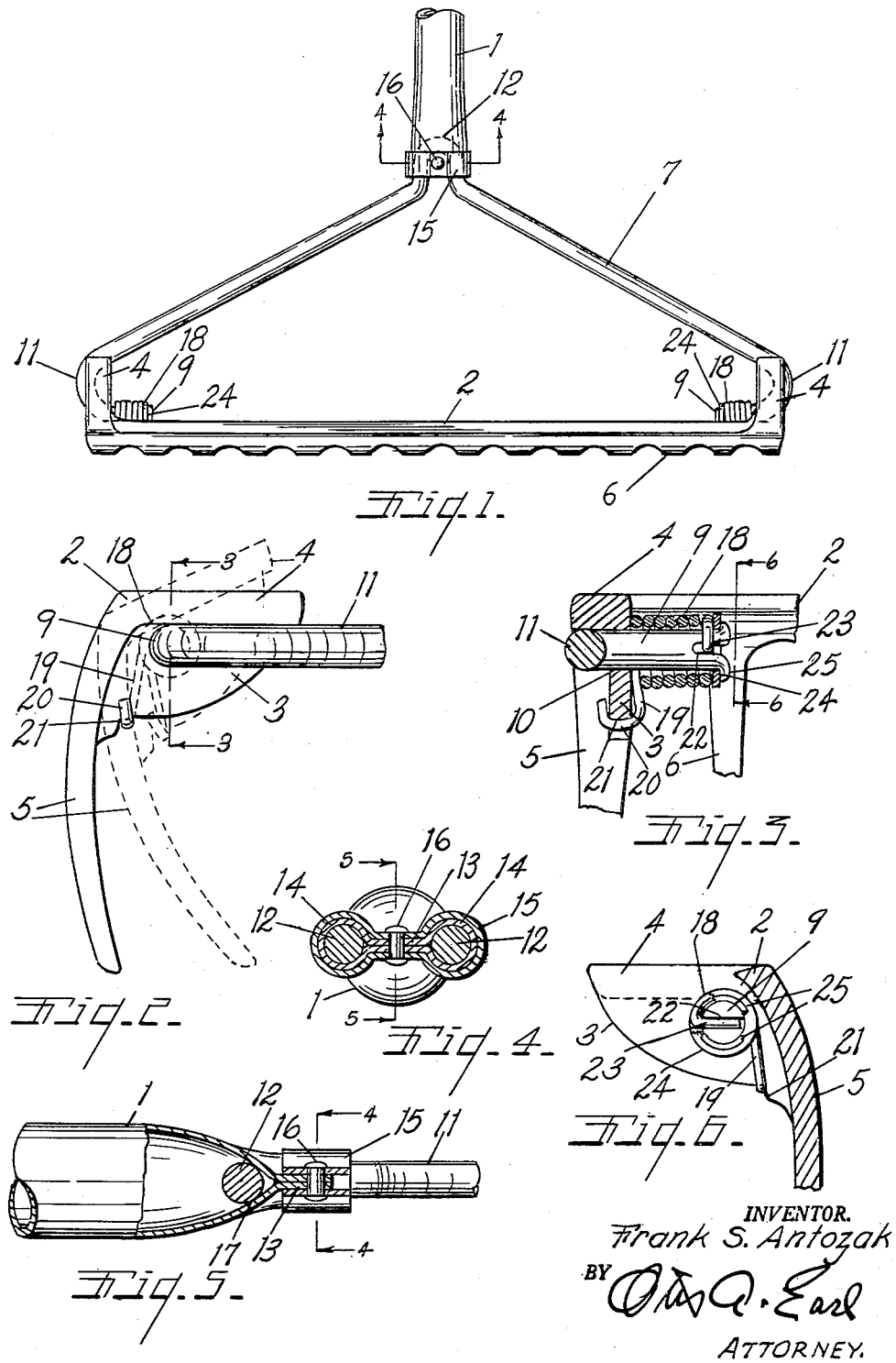
INVENTOR.
Frank S. Antozak
BY Otto A. Earl
ATTORNEY.

United States Patent Office 2,836,031
Patented May 27, 1958

2,836,031

SELF CLEANING RAKE AND HANDLE STRUCTURE

Frank S. Antozak, Grand Rapids, Mich.

Application November 3, 1954, Serial No. 466,549

4 Claims. (Cl. 56—400.2)

This invention relates to a self cleaning rake and a handle well adapted for sustaining the stresses to which a rake is subjected.

The main objects of this invention are:

First, to provide a self cleaning rake in which the parts are simple and economical to produce and assemble and at the same time the structure is strong and rigid.

Second, to provide a self cleaning rake provided with return springs for the rake head which are mounted so as to effectively perform their functions and at the same time are protected from injury in the use of the rake.

Third, to provide a handle structure for an implement of this character in which the handle proper may be formed of light tubing and at the same time the implement attaching yoke is securely and rigidly attached thereto.

Objects relating to details and economies of the invention will appear from the description to follow. The invention is defined and pointed out in the claims.

A preferred embodiment of the invention is illustrated in the accompanying drawing, in which:

Fig. 1 is a plan view of a rake embodying my invention with the handle partially broken away.

Fig. 2 is an enlarged fragmentary end view with the rake head shown in raking position by full lines and in a clearing position by dotted lines.

Fig. 3 is an enlarged fragmentary view mainly in section on a line corresponding to line 3—3 of Fig. 2.

Fig. 4 is an enlarged sectional view on a line corresponding to line 4—4 of Figs. 1 and 5.

Fig. 5 is a fragmentary view in section on a line corresponding to line 5—5 of Fig. 4.

Fig. 6 is a fragmentary view in section on a line corresponding to line 6—6 of Fig. 3.

In the accompanying drawing the handle member 1 is tubular being desirably formed of a section of aluminum tubing. The rake head 2 is desirably formed as a casting and is provided with rearwardly projecting arms 3 having outturned flanges 4 on their upper edges. These flanges constitute reinforcing elements for the arms and serve as stops as will be later pointed out.

The arms 3 are relatively wide at their front ends and taper rearwardly. The arms merge into the end teeth 5 of the rike constituting reinforcements therefor. This is of importance as the end teeth of the rake are commonly subjected to more severe shocks and strains and stresses than the intermediate teeth 6.

The rake head supporting yoke designated generally by the numeral 7 comprises the forwardly diverging arms which terminate in inwardly projecting pintles 9 disposed through holes 10 provided therefor in the rake head arms 3. The yoke arms have curved portions 11 at their outer ends which merge into the pintles. The arms are integrally connected by the loop like shank 12 which is telescoped into the end of the tubular handle.

The tubular handle member is upset at 13 between the arms of the shank and conformed to closely embrace them at 14. A reinforcing band 15 is disposed around the handle member and embracingly conformed to the upset end of the handle member. In practice the band is slipped on the handle and upset and conformed simultaneously with the upsetting of the end of the handle.

The clamping rivet 16 is disposed through the upset portions of the band and handle member between the arms of the shank. The upset of the handle is such that it engages the bight of the loop at 17. This provides a very simple but secure connection for the yoke to the handle member and one which permits the use of material such as a relatively thin walled aluminum tubing.

The arms of the yoke can be sprung outwardly to permit the insertion of the pintles 9 into the bearing holes 10 provided therefor in the arms 3 of the rake head. This is desirably done one at a time. The pintles are of considerable length and are quite closely spaced relative to the bar portion of the rake head.

Coil springs 18 are arranged on these pintles and terminate in arms 19 at their inner ends having hooks 20 engaged with the notches 21 in the rake head arms 3.

The inner ends of the pintles have longitudinal slots 22 opening to the ends thereof. These slots receive the inturned lugs 23 at the outer end of the springs. While the tension of the springs tends to hold them on the pintles they are positively retained by means of the washer like collars 24 sleeved upon the pintles and retained thereon by upsetting the ends of the pintles at 25.

The flange like stop members 4 engage the curved end portions of the yoke arms to limit the outward movement of the rake head under the biasing action of the springs. The side members of the yoke are closely adjacent to the head arms 3 so that lateral movement of the head relative to the yoke is prevented and a very strong and secure connection is provided.

I have illustrated and described my invention in a highly practical embodiment thereof. I have not attempted to illustrate or describe other embodiments as it is believed this disclosure will enable those skilled in the art to embody or adapt my invention as may be desired.

Having thus described my invention, what I claim as new and desire to secure by Letters Patent is:

1. A rake comprising a handle provided with outwardly diverging springable rake head yoke arms terminating at their outer ends in inwardly directed rake head pintles, the pintles having longitudinally disposed slots in their inner ends, a rake head having rearwardly projecting arms at its ends provided with bearing openings through which said pintles are disposed with the pintles projecting inwardly of the arms, the arms having outwardly projecting stops overhanging and engaging the yoke arms when the rake head is in erected position, coil springs supportedly sleeved upon said spindles at the inner sides of said arms and terminating at their outer ends with hooked arms engaged with bottom edges of said rake head arms and at their inner ends with lugs engaged in said slots in said pintles with the springs tensioned to yieldingly urge said rake head to erected position with its said stops in supported engagement with said yoke arms, and spring retaining collars disposed and retained on said pintles at the inner ends of said springs.

2. A rake comprising a handle provided with outwardly diverging springable rake head yoke arms terminating at their outer ends in inwardly directed rake head pintles, the pintles having longitudinally disposed slots in their inner ends, a rake head having rearwardly projecting arms at its ends provided with bearing openings through which said pintles are disposed with the pintles projecting inwardly of the arms, the arms having outwardly projecting stops overhanging and engaging the yoke arms when the rake head is in erected position, and coil springs supportedly sleeved upon said spindles at the inner sides of said arms and terminating at their outer ends with hooked arms engaged with bottom edges of said rake head arms and at their inner ends with lugs engaged in said slots in said pintles with the springs tensioned to yieldingly urge said rake head to erected position with its said stops in supported engagement with said yoke arms.

3. A rake comprising a handle provided with outwardly diverging rake head yoke arms terminating at their outer ends in inwardly directed rake head pintles into which the arms curvedly merge, a rake head having rearwardly projecting arms at its ends provided with bearing openings through which said pintles are disposed with the pintles projecting inwardly of the arms, the arms having flange like outwardly projecting flange like stops overhanging and engaging the ends of the yoke arms when the rake head is in erected position, and coil springs supportedly sleeved upon said spindles at the inner sides of said arms with their outer ends engaged with said rake head, and with their inner ends engaged with said pintles with the springs tensioned to yieldingly urge said rake head to erected position with its said stop in supported engagement with said yoke arms.

4. A rake comprising a handle provided with outwardly diverging rake head yoke arms terminating at their outer ends in inwardly directed rake head pintles, a rake head having rearwardly projecting arms at its ends provided with bearing openings through which said pintles are disposed with the pintles projecting inwardly of the arms, the arms having flange like outwardly projecting flange like stops overhanging and engaging the ends of the yoke arms when the rake head is in erected position, and coil springs supportedly sleeved upon said spindles at the inner sides of said arms with their outer ends engaged with said rake head, and with their inner ends engaged with said pintles with the springs tensioned to yieldingly urge said rake head to erected position with its said stop in supported engagement with said yoke arms.

References Cited in the file of this patent

UNITED STATES PATENTS

| | | |
|---|---|---|
| 789,021 | Hartman | May 2, 1905 |
| 1,158,640 | Clute | Nov. 2, 1915 |
| 1,612,894 | Thompson | Jan. 4, 1927 |
| 1,728,433 | Mohun | Sept. 17, 1929 |
| 2,162,648 | Slusher | June 13, 1939 |
| 2,671,302 | Prudlo | Mar. 9, 1954 |
| 2,700,564 | Le Febvre | Jan. 25, 1955 |

FOREIGN PATENTS

| | | |
|---|---|---|
| 598,936 | Germany | Aug. 4, 1934 |